United States Patent [19]
Helevirta

[11] Patent Number: 5,222,770
[45] Date of Patent: Jun. 29, 1993

[54] CONNECTOR FOR A HYDRAULIC PRESSURE HOSE

[75] Inventor: Kauko Helevirta, Tampere, Finland

[73] Assignee: Rauma-Repola Oy, Tampere, Finland

[21] Appl. No.: 659,400

[22] PCT Filed: Jun. 27, 1990

[86] PCT No.: PCT/FI90/00170
§ 371 Date: Feb. 27, 1991
§ 102(e) Date: Feb. 27, 1991

[87] PCT Pub. No.: WO91/00468
PCT Pub. Date: Jan. 10, 1991

[30] Foreign Application Priority Data

Jun. 30, 1989 [FI] Finland ............... 893201

[51] Int. Cl.⁵ ............... F16L 33/207; F16L 11/127; F16L 25/02
[52] U.S. Cl. .................... 285/53; 439/191; 174/47; 361/215; 285/149
[58] Field of Search .............. 174/47; 361/215; 285/53, 7, 149, 47, 50; 439/190, 191

[56] References Cited

U.S. PATENT DOCUMENTS

| | | | |
|---|---|---|---|
| 749,633 | 1/1904 | Seeley | 174/47 |
| 1,223,864 | 4/1917 | French | 361/215 X |
| 1,726,957 | 9/1929 | Hughes | 174/47 |
| 2,103,758 | 12/1937 | Seyfried | 361/215 X |
| 2,883,513 | 11/1957 | Schnabel | 174/47 |
| 2,969,415 | 1/1961 | Hartill et al. | 174/47 X |
| 3,457,359 | 7/1969 | Soucy | 361/215 |
| 3,749,814 | 7/1973 | Pratt | 174/47 |
| 3,936,118 | 2/1976 | Thiery et al. | 439/191 |
| 4,009,733 | 3/1977 | Schnabel | 138/103 |
| 4,012,091 | 3/1977 | Westergren | 285/7 |
| 4,059,847 | 11/1977 | Phillips et al. | 361/215 |
| 4,215,384 | 7/1980 | Elson | 361/215 |
| 4,675,780 | 6/1987 | Barnes et al. | 361/215 |
| 4,870,535 | 9/1989 | Matsumoto | 361/215 |
| 4,894,020 | 1/1990 | Holden et al. | 439/191 |
| 4,901,975 | 2/1990 | Gill et al. | 439/191 |

FOREIGN PATENT DOCUMENTS 2225060 12/1973 Fed. Rep. of Germany .
3543233 6/1987 Fed. Rep. of Germany .

Primary Examiner—Eric K. Nicholson
Attorney, Agent, or Firm—Pollock, Vande Sande & Priddy

[57] ABSTRACT

The invention relates to a connector for a hydraulic pressure hose, said connector comprising a body (7) which includes a first sleeve member (8), to be fitted inside the end of a hydraulic pressure hose, as well as a connecting member (11). The connecting member (11) preferably includes a gripping means (12) for a tool and a fastening means (13), such as a threaded portion for coupling the connector with a hydraulic system. In addition, the connecting member (11) includes a second sleeve member (9) mounted outside the end of a house in line with said first sleeve member (8), said sleeve members (8,9) being adapted, upon mounting the connector on a hydraulic pressure hose, to squeeze towards each other and to clamp the end of hydraulic pressure hose therebetween. At least a part of at least one of the sleeve members (8,9) is electrically insulated from body (7).

16 Claims, 4 Drawing Sheets

CONNECTOR FOR A HYDRAULIC PRESSURE HOSE

FIELD OF THE INVENTION

The present invention relates to a connector for a hydraulic pressure hose. The connector comprises a body, provided with a first sleeve member to be fitted inside the end of a hydraulic pressure hose, and a connecting member which preferably includes a fixing means for a working tool and a fastening means, such as a threaded portion, for fastening the connector to a hydraulic system, as well as a second sleeve member to be fitted outside the end of a hydraulic pressure, hose face to face with the first sleeve member, the first and second sleeve members being adapted, upon mounting the connector on a hydraulic pressure hose, to squeeze toeards each other and to clamp the end of a hydraulic pressure hose therebetween.

BACKGROUND OF THE INVENTION

This type of connectors are prior known and particularly used in hydraulics. The modern hydraulic systems not only include more and more actuators but also a lot of controls. Electrical control, in terms of valves, pumps and hydraulic motors, is highly complicated and susceptible to trouble in modern systems.

SUMMARY OF THE INVENTION

An object of this invention is to provide such a connector for a hydraulic pressure hose, which is to a substantial degree capable of eliminating the present drawbacks and, thus, of improving the prior art. In order to achieve this object, a connector of the invention is primarily characterized in that at least a part of at least one of the sleeve members of the connector is electrically insulated from the body.

The above solution provides a simple-design hydraulic pressure hose connector, at the same time allowing possibilities for electric connection when applied to a hydraulic pressure hose which is fitted with one or more conductors with which one or more sleeve sections included in the sleeve member are in electrical contact when the connector is mounted on the end of a hydraulic pressure hose. Thus, the hydraulic pressure hose can be employed, on the one hand, as a hydraulic medium carrier hose and, on the other hand, for example, for the control of actuators in the transmission of electric messages.

The invention relates also to a hydraulic pressure hose for use in association with the connector.

The invention will now be described in more detail in the following specification with reference made to an exemplary embodiment shown in the accompanying drawings. In the drawings.

DETAILED DESCRIPTION OF THE PREFERRED EMBODIMENT

Figure 1:
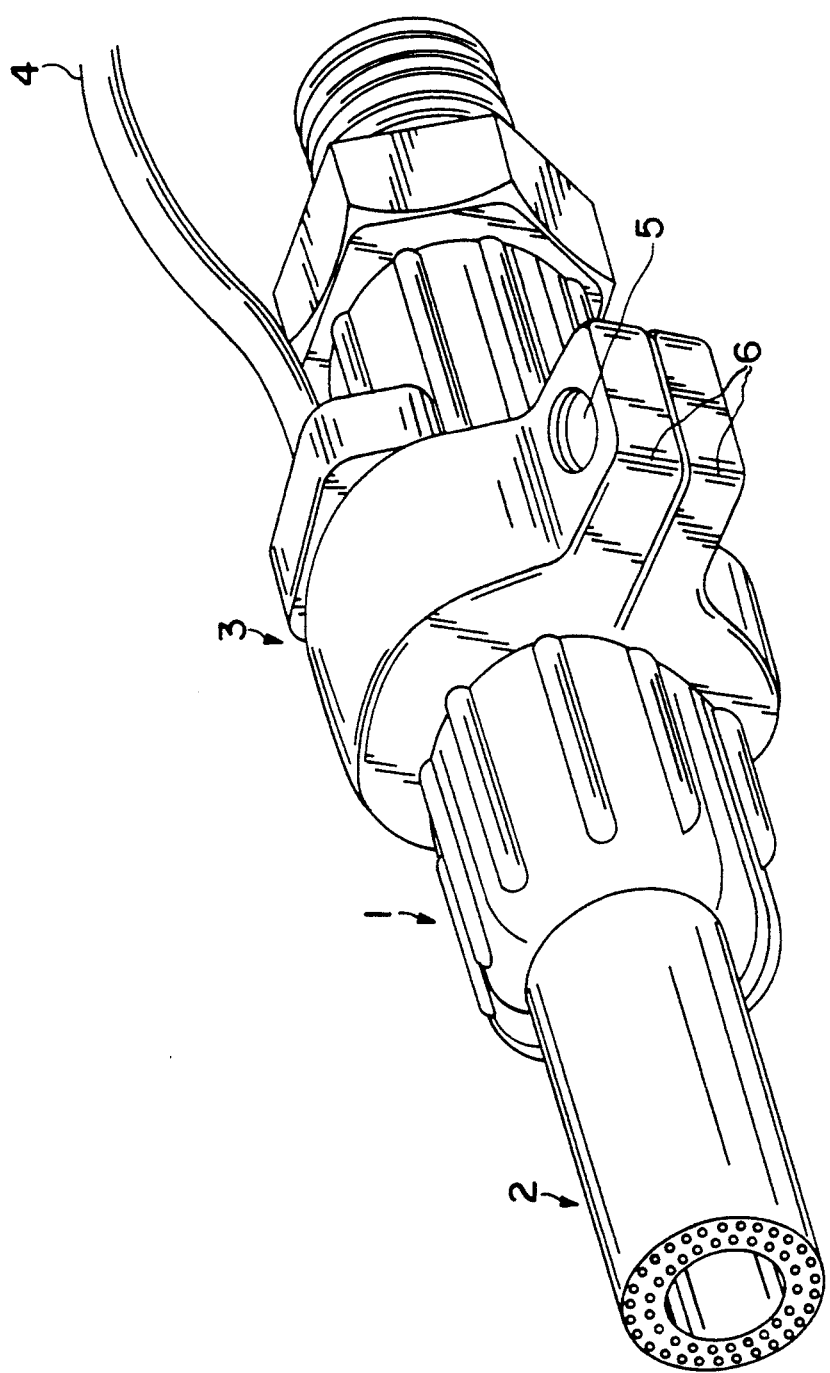
FIG. 1 shows a perspective view of a connector of the present invention mounted on a hydraulic pressure hose.

Rererring particularly to FIG. 1, a connector 1 of the invention is mounted on a hydraulic pressure hose 2. The outer surface of connector 1 is fitted with an electric coupling means 3 having an electric wire 4 extending therefrom. The electric coupling means 3 is a shaped piece assembled with a screw 5 to form a ring shape. Screw 5 extends between brackets 6 in the electric coupling piece.

Figure 2:
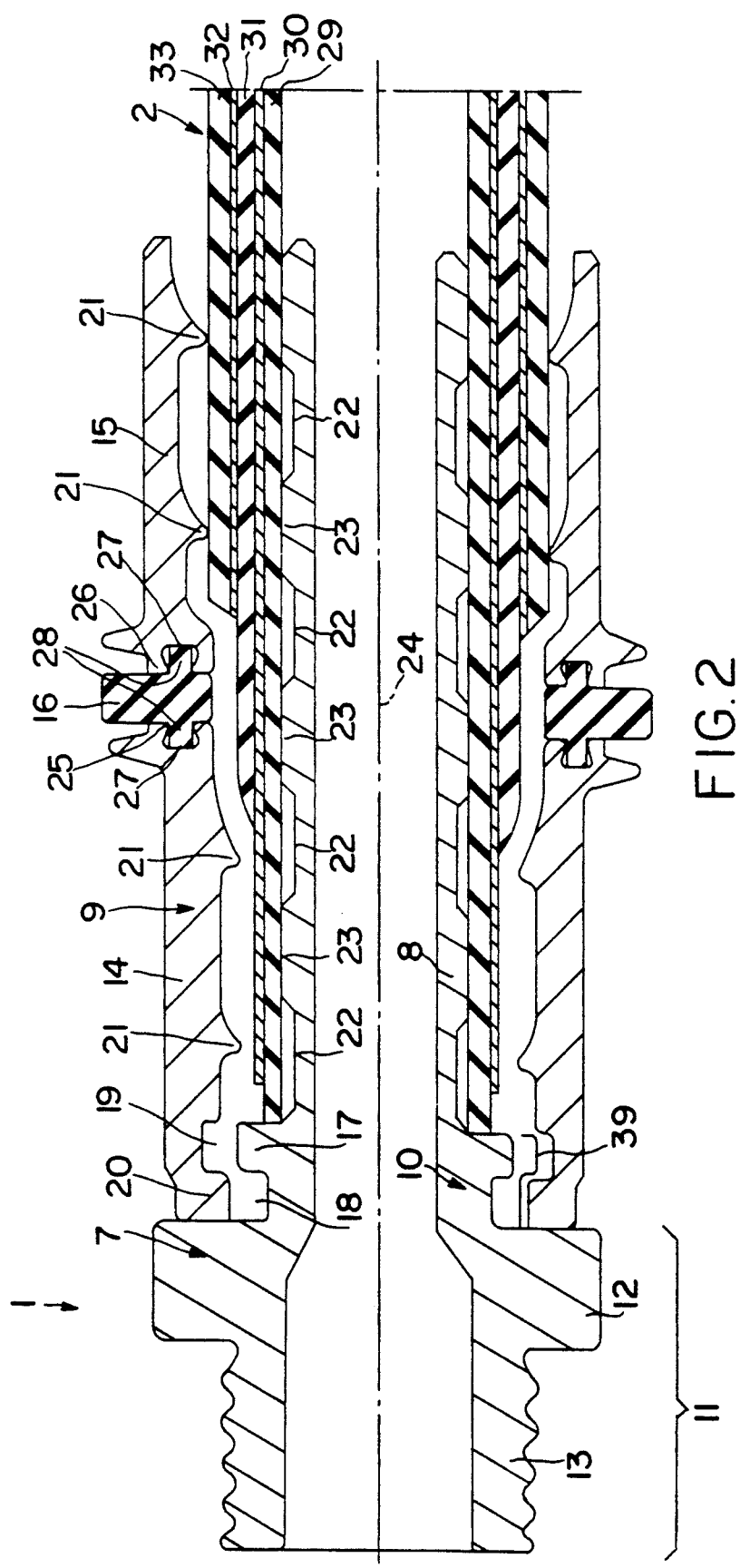
FIG. 2 shows a connector in a longitudinal section prior to mounting.

FIG. 2, in particular, illustrates the main components of the connector of the present invention. Connector 1 has a body 7 which includes as its main components a first sleeve member 8 and a connecting member 11. The first sleeve member 8 is fitted inside a hydraulic pressure hose when installing the connector on a hydraulic pressure hose. The body 7 further includes a fastening means 10 for connection to a second sleeve member 9, said fastening means extending from the end of a hydraulic pressure hose as an integral part of sleeve member 8. The fastening means 10 is followed by connecting member 11 for the body 7, the connecting member including a fixing or gripping means 12 for a tool, for example, a nut member intended for an adjustable wrench, as well as a fastening means as an extension thereof, such as a threaded portion 13 for coupling the connector to a hydraulic system.

The second sleeve member 9, in turn, includes a first sleeve section 14, a second sleeve section 15, and an insulation member 16 positioned therebetween. The components 14–16 are mounted on the outside of the machined end of a hydraulic pressure hose surrounding the end of hydraulic pressure hose 2.

In the illustrated embodiment, the body 7 and the second sleeve member 9 are coupled together by using on the one hand a fastening means 10, provided with an outwardly-directed jutting annular collar 17 extending from the end of hydraulic pressure hose 2 mounted, on top of sleeve member 8 and extending into the sleeve member as well as with an annular groove 18 positioned between the annular collar 17 and gripping means 12. Accordingly, the first sleeve section 14 includes as counter-fastening means an internal groove 19 aligned with annular collar 17 and an inwardly-directed annular collar 20 with annular groove 18. The components of the second sleeve member 9 are dimensioned in such a manner that, when machined at its end for mounting, the hydraulic pressure hose can be inserted in a cylindrical annular space formed by the outer surface of first sleeve member 8 and the inner surface of second, sleeve member 9. The sleeve sections 14, 15 of the second sleeve member 9 carry on their internal surface preferably cross-sectionally triangular, inwardly-directed annular collars 21 at fixed spacings, in this case two in each sleeve section 14, 15. On the other hand, the first sleeve member 8 is provided on its external surface and also at fixed spacings with a plurality (four) of grooves 22 which are linked with each other through the intermediary of equidiameter necks 23. The external surface of necks 23 is parallel to the center axis 24 of first sleeve member 8.

Figure 3:
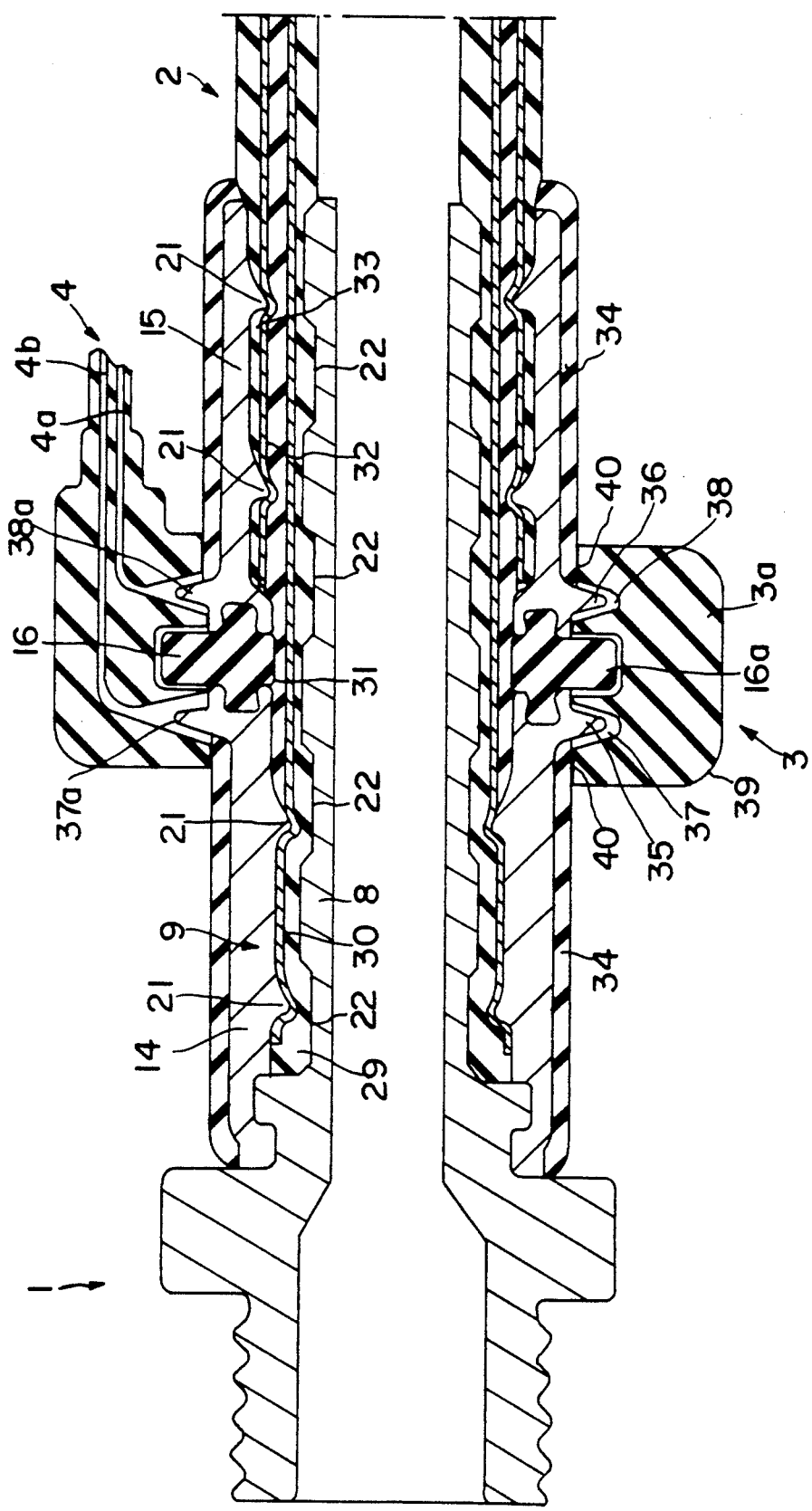
FIG. 3 shows a connector mounted on the end of a hydraulic pressure hose also in a longitudinal section.

Between first and second sleeve sections 14, 15 an insulation member 16 is fitted. The insulation member 16 is fixed in annular grooves 27 formed on the opposite mutually facing surfaces 25, 26 of sleeve sections 14, 15 (in the present embodiment one annular groove 27 in each opposite surface 25, 26), the grooves being substantially of equal size and shape. The insulation member 16 is annular in configuration and includes annular collars 28, extending in both directions from its radial side faces and set in the annular grooves 27 made in first and second sleeve sections 14, 15. As particularly shown in FIG. 2, the insulation member 16, which is preferably made of ebonite material and thus has a resilient structure, is designed in such a manner that the cross-sectional area of annular collars 28 in a rest condition (prior to the mounting of a connector) is smaller than that of annular grooves 27, whereby the resilient insulation member 16 yields as the second sleeve member 9 is pressed against the external surface of hydraulic pressure hose 2. Thus, the annular collars 28 of insulation member 16 fill the annular grooves, as shown in FIG. 3. The annular grooves 27 can preferably be designed as having a dovetail shape expanding towards the bottom.

In the embodiment shown in FIGS. 2 and 3, a hydraulic pressure hose 2 of the invention includes as its innermost component an inner rubber layer 29. Outside that is a first conductor layer 30. Outside the first conductor layer 30 is in turn an intermediate insulation layer 31 with a second conductor layer 32 on its outer surface. The outermost component in a hydraulic pressure hose is an outer layer 33. The materials for layers 29, 31 and 33 can be e.g. rubber or ebonite. As illustrated in FIGS. 2 and 3, the hydraulic pressure hose has its end machined in such a manner that, at the first sleeve section 14, the material is removed up to intermediate insulation layer 31 and, at the second sleeve section 15, there is no material removed at all or material is removed up to second conductor layer 32.

Starting from the situation shown in FIG. 2 and effecting a conventional press clamping of the hydraulic pressure hose connector for example, by means of a device disclosed in GB Patent 2 003 776, which device, especially its jaw assembly, can be subjected to necessary structural modifications required particularly by the insulation member, the result will be a situation as shown in FIG. 3, wherein the first layer 29 of a hydraulic pressure hose is pressed in grooves 22 of the first sleeve member and the annular collars 21 of first sleeve section 14 are partially penetrated into the first layer 29 and the annular collars 21 as well as the entire essential portion of sleeve section 14 between annular collars 21 are in good electrical contact with the first conductor layer 30 of a hydraulic pressure hose.

The inner surfaces in proximity of the first sleeve section 14 and the insulation member 16 of second sleeve section 15, as well as the entire insulation member 16, are in connection with the central intermediate insulation layer 31 of a hydraulic pressure hose. On the other hand, the second sleeve section 15, particularly at annular collars 21, has squeezed into contact with the second conductor layer 32 of hydraulic pressure hose 2. The outer surface of second sleeve member 9 is possibly after the pressing still subjected to insulation coating, for example by the application of insulating rubber 34.

An electric coupling means 3, made of an insulating material as for its body 3a, is coupled, on the one hand, with an annular bracket 35 associated with first sleeve section 14 and extending from its outer surface and, on the other hand, with a complementary-shaped annular bracket 36 associated with second sleeve section 15, the brackets being located on either side of insulation member 16. Said annular brackets 35 and 36 are adapted to receive complementary-shaped grooves 37 and 38 extending in said electric coupling means 3 to its inner surface 40 clamping to the outer surface of one sleeve section 14, said grooves being provided with coupling means 37a and 38a for electrical wires 4a and 4b. The inner surface 40 of electric coupling means 3 is also provided with an outwardly-directed groove 42 for a portion 16a included in insulation member 16 and extending from the outer surface of the sleeve member 9 of insulation member 16.

Figure 4:
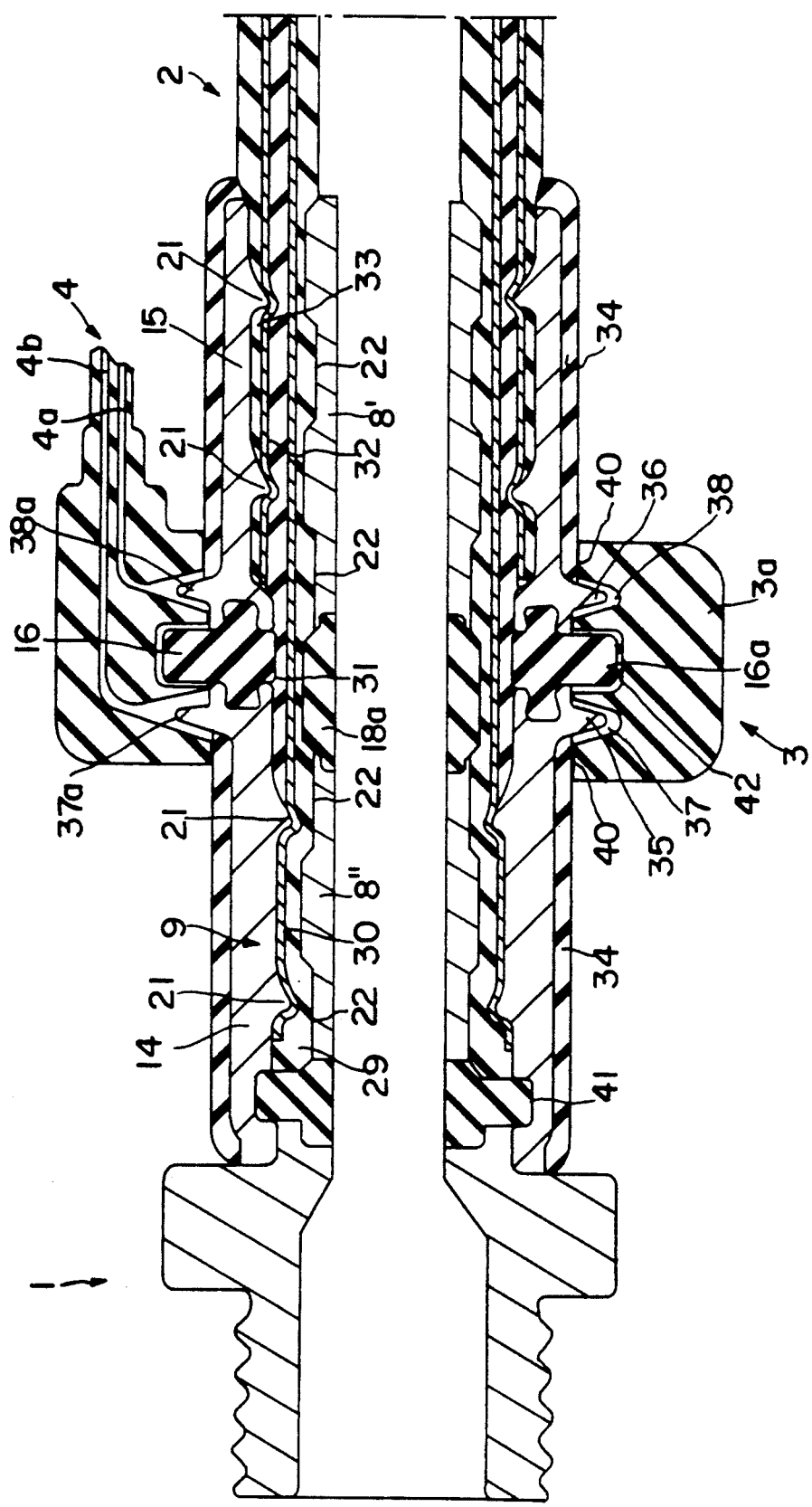
FIG. 4 shows a second embodiment of the connector according to the present invention.

From the above it is obvious for a skilled person that a connector of the invention can be considerably varied within the scope of the basic inventive conception. It is obvious that, first of all, between body 7 and first sleeve section 14, for example, between components 17, 18 and 19, 20, can be fitted an electrical insulation (detail 39 in FIG. 2), or 41 in FIG. 4 whereby the body 7, for example, can be used in the grounding of a hydraulic system. On the other hand, it is clear that the described radially-directed spacing of second sleeve member 9 can be replaced with a spacing of zones between different electric circuits in the circumferential direction of a hydraulic pressure hose, whereby the insulation member extends in the longitudinal direction of the sleeve member instead of and/or in addition to; the radially-directed insulation member 16 shown in FIGS. 2 and 3. It is further obvious that the first sleeve member 8 can also be divided into sleeve sections which extend into various layers. For example, FIG. 4 shows an embodiment in which insulation member 16 extends between sleeve sections 8', 8'' of the first sleeve member.

I claim:

1. A connector for a hydraulic pressure hose, said hydraulic pressure hose including at least one layer fitted between insulating material layers, said connector comprising:

an electrically grounded body including a first sleeve member, said first sleeve member being inserted into an end of said hydraulic pressure hose, and a connecting member including a gripping means for a tool and a fastening means for fastening the connector to a hydraulic system; and a second sleeve member including at least one sleeve section to be fitted on the outside surface of said end of the hydraulic pressure hose, said hydraulic pressure hose being located between said first sleeve of said body and said second sleeve and clamped therebetween upon placement of said second sleeve over said first sleeve;

at least one of said first and second sleeve members including at least one element coming into electrical contact with at least one conductor layer of said hydraulic pressure hose upon mounting of said connector on said hydraulic pressure hose for transmission of electrical signals and wherein at least that part of at least one sleeve member which comprises said element, and an electric coupling means are being electrically insulated from said body and whereby said conductor layer is used for transmission of said electrical signals while separated from said grounded body.

2. A connector as set forth in claim 1, wherein at least one of said first and second sleeve members is divided into at least two sleeve sections which are electrically insulated from each other by an insulation member, wherein at least some of the sleeve sections are adapted, upon mounting of the connector on a hose, to extend radially to various distances from the center axis of the connector.

3. A connector as set forth in claim 1, wherein said second sleeve member is divided into at least two sleeve sections.

4. A connector as set forth in claim 3, wherein said second sleeve member has its first sleeve section fastened to said body.

5. A connector as set forth in claim 4, wherein said first sleeve section is fastened to said body through the intermediary of an insulation member.

6. A connector as set forth in claim 2, wherein the division of said at least one sleeve member into at least two sleeve sections is effected in the radial direction of a connector and in its circumferential direction.

7. A connector as set forth in claim 2, wherein the division of said at least one sleeve member into at least two sleeve sections is effected in a direction perpendicular to the longitudinal direction of a connector, whereby said insulation member is annular in configuration.

8. A connector as set forth in claim 7, wherein said insulation member is mounted on opposing frontal surfaces of said sleeve sections.

9. A connector as set forth in claim 2, wherein opposing frontal surfaces of said sleeve sections are provided with at least one groove or the line and wherein said insulation member includes brackets or the like in both radial side faces, the number of which corresponds to that of the grooves.

10. A connector as set forth in claim 9, wherein said at least one groove is an annular groove and said brackets are annular brackets.

11. A connector as set forth in claim 9, wherein said insulation member is made of a resilient material and wherein said brackets or the like included therein have a cross-section which in the rest condition of said insulation member is smaller than that of said groove or the like in the frontal surface of said sleeve sections, said bracket or the like, yielding upon mounting a connector, thus filling said groove due to its deformation.

12. A connector as set forth in claim 1, wherein an electric coupling means provided with at least one coupling member included in an insulating body is adapted to be mounted in line with said insulation member for electric contact with said at least one sleeve section.

13. A connector as set forth in claim 7, wherein said sleeve sections are on either side of said insulation member provided with annular brackets or the like for installing said coupling members included in electric coupling means.

14. A connector as set forth in claim 2, wherein the inner surface of at least said second sleeve section is provided with at least one inwardly-directed collar or the like in both sleeve sections, said collar or the like being adapted to extend along with a conductor section included in said hydraulic pressure hose and to be brought into electric contact with a corresponding sleeve section.

15. A connector as set forth in claim 2, wherein the outer surface of at least said first sleeve member is provided with a set of grooves or the like.

16. A connector as set forth in claim 1, wherein the outer surface of said second sleeve member is coated with an electrically insulating material.

* * * * *